US006513027B1

United States Patent
Powers et al.

(12) United States Patent
(10) Patent No.: US 6,513,027 B1
(45) Date of Patent: Jan. 28, 2003

(54) AUTOMATED CATEGORY DISCOVERY FOR A TERMINOLOGICAL KNOWLEDGE BASE

(75) Inventors: Joshua Powers, Foster City, CA (US); James Conklin, Scotts Valley, CA (US)

(73) Assignee: Oracle Corporation, Redwood Shores, CA (US)

(*) Notice: Subject to any disclaimer, the term of this patent is extended or adjusted under 35 U.S.C. 154(b) by 0 days.

(21) Appl. No.: 09/270,319

(22) Filed: Mar. 16, 1999

(51) Int. Cl.$^7$ .................................................. G06N 5/00
(52) U.S. Cl. ............................ 706/47; 704/9; 704/10
(58) Field of Search ..................... 706/47, 45; 707/102, 707/104, 5; 704/9, 10

(56) References Cited

U.S. PATENT DOCUMENTS

| | | | | |
|---|---|---|---|---|
| 4,868,733 A | * | 9/1989 | Fujisawa et al. | 707/5 |
| 5,442,780 A | * | 8/1995 | Takanashi et al. | 707/1 |
| 5,689,716 A | * | 11/1997 | Chen | 707/500 |
| 5,832,494 A | * | 11/1998 | Egger et al. | 707/102 |
| 6,199,034 B1 | * | 3/2001 | Wical | 704/9 |

OTHER PUBLICATIONS

Wang Weiwei; Lin Biqin; Chen Fang; Yuan Baozong, A natural language generation system based on dynamic knowledge base, Signal Processing, 1996., 3rd International Conference on, vol.: 1, Oct. 14–18, 1996, pp.: 765–768 vol. 1.*

Mayer, G.; Yamamoto, C.; Evens, M.; Michael, J.A., Constructing a knowledge base from a natural language text, Computer–Based Medical Systems, 1989. Proceedings., Second Annual IEEE Symposium on, Jun. 26–27, 1989, pp.: 98–107, Oct. 1996.*

* cited by examiner

Primary Examiner—Wilbert L. Starks, Jr.
(74) Attorney, Agent, or Firm—Stattler, Johansen & Adeli, LLP

(57) ABSTRACT

A terminological system automatically generates sub-categories from categories of a knowledge base. The knowledge base includes a plurality of hierarchically arranged categories, as well as terms associated with the categories. A subset of the categories of the knowledge base are designated "dimensional categories." The system also stores a corpus of documents, including themes and corresponding theme weights for each document. A target category is selected to generate sub-categories. A set of themes from the corpus of documents are selected for each term. Dimensional category vectors, one for each term, are generated by associating the set of themes for a term to a dimensional category in the knowledge base. The dimensional category vectors for each term are analyzed to determine if one or more clusters of terminological groups exist to generate new sub-categories. A content processing system, which generates themes and theme weights, is also disclosed.

11 Claims, 6 Drawing Sheets

AUTOMATED CATEGORY DISCOVERY FOR A TERMINOLOGICAL KNOWLEDGE BASE

BACKGROUND OF THE INVENTION

1. Field of the Invention

The present invention is directed toward the field of morphological and ontological systems, and more particularly toward techniques to automatically discover categories in a terminological knowledge base.

2. Art Background

In general, knowledge bases include information arranged to reflect ideas, concepts, or rules regarding a particular problem set. Knowledge bases have application for use in natural language processing systems (a.k.a. artificial linguistic or computational linguistic systems). These types of knowledge bases store information about language. Specifically, natural language processing knowledge bases store information about language, including how terminology relates to other terminology in that language. For example, such a knowledge base may store information that the term "buildings" is related to the term "architecture," because there is a linguistic connection between these two terms.

Natural language processing systems use knowledge bases for a number of applications. For example, natural language processing systems use knowledge bases of terminology to classify information or documents. One example of such a natural language processing system is described in U.S. Pat. No. 5,694,523, entitled "Content Processing System for Discourse," issued to Kelly Wical on Dec. 2, 1997, which is expressly incorporated herein by reference.

Terminological knowledge bases also have application for use in information search and retrieval systems. In this application, a knowledge base may be used to identify terms related to the query terms input by a user. One example for use of a knowledge base in an information search and retrieval system is described in U.S. patent application Ser. No. 09/095,515, entitled "Hierarchical Query Feedback in an Informative Retrieval System," Inventor Mohammad Faisal, filed on Jun. 10, 1998 and U.S. patent application Ser. No. 09/170,894, entitled "Ranking of Query Feedback Terms in an Information Retrieval System," Inventors Mohammad Faisal and James Conklin, filed on Oct. 13, 1998, both of which are incorporated herein by reference.

One type of terminological knowledge base, disclosed in U.S. patent application Ser. No. 09/095,515, associates one or more terms or concepts with categories of the knowledge base. For example, the category "operating systems" may include a number of concepts, although associated with the category "operating systems", are not categories themselves. For this example, the terms "UNIX", "Windows '98", and "Mac OS8" may be associated with the knowledge base category "operating systems." In one implementation for a terminological knowledge base, there may be hundreds or even thousands of these terms associated with a single category.

As discussed above, natural language processing systems use terminological knowledge bases to classify information, such as documents. If these natural language processing systems classify terms primarily based on categories, then it is desirable to provide as many categories as possible while still maintaining the accuracy of the ontological distinctions. If a single category has associated with it hundreds or thousands of terms, then the categorization of a particular document to a term loses distinction as the number of terms grows large in the single category. Accordingly, a document classified in a category that has too many terms associated with that category becomes difficult to accurately index, with regard to the proper classification of subject matter in that document. Similarly, if the number of concepts in a single category grows too large, then the performance of terminological knowledge bases for use in information search and retrieval systems becomes degraded. For example, if a category of a knowledge base is used to identify additional subject matter areas from a search query, and a single category is associated with 1,000 terms, then the use of that category to identify additional subject matter may become overly inclusive (i.e., too many subject matter areas are identified through the single category in the knowledge base). Accordingly, it is desirable to limit the number of concepts or terms associated with a single category of a terminological knowledge base.

One way of controlling the number of concepts associated with a single category is to split the category up into one or more subcategories. Using this approach, terms within that single category that are related may become subcategories beneath the parent or original category. One approach to splitting or dividing categories is through a linguist's manual interpretation of each category to determine both whether a category should be subdivided, and if so, which terms associated with that category should be subdivided. The manual process of making these determinations is laborious. In addition, if different linguistics use different criteria, the knowledge base may grow to include subcategories based on underlying principles that may differ. Accordingly, it is desirable to automate the process of splitting one or more groups of terms associated with a single category to generate one or more subcategories.

SUMMARY OF THE INVENTION

A terminological system automatically generates sub-categories from categories of a knowledge base. The knowledge base includes a plurality of hierarchically arranged categories, as well as terms associated with the categories. A subset of the categories of the knowledge base are designated "dimensional categories." A target category in the knowledge base is selected to generate sub-categories for some of the terms associated with the target category. The system also stores a corpus of documents, including themes and corresponding theme weights for each document. A target category is selected to generate sub-categories. A set of themes from the corpus of documents are selected for each term. Dimensional category vectors, one for each term, are generated by associating the set of themes for a term to a dimensional category in the knowledge base. The dimensional category vectors for each term are analyzed to determine if one or more clusters of terminological groups exist. If one or more terminological groups exist, then the terminological groups form terms associated with a new sub-category.

DETAILED DESCRIPTION

Category Discovery System Overview

Figure 1:
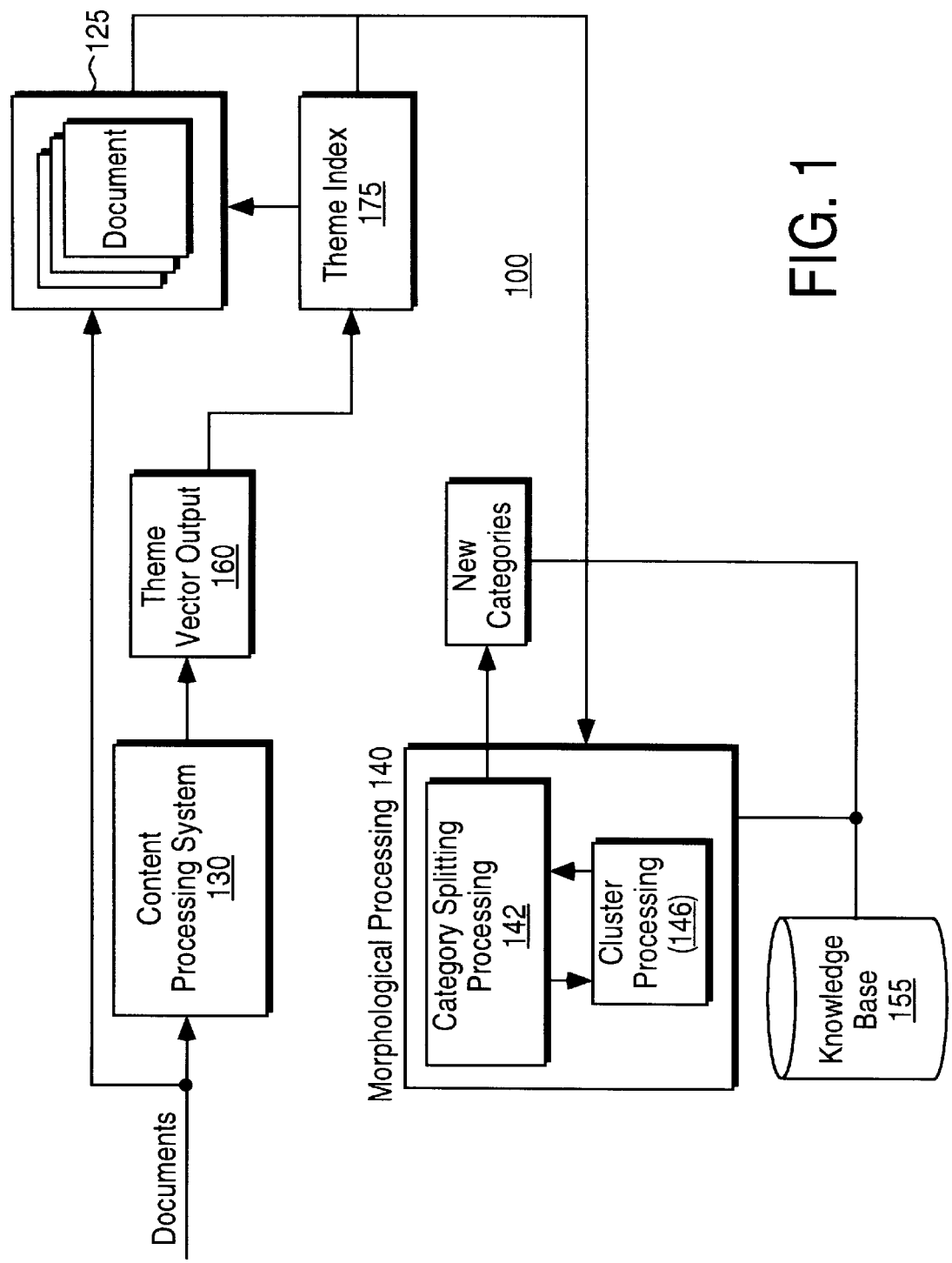
FIG. 1 is a block diagram illustrating one embodiment for a terminological system incorporating the category discovery techniques of the present invention.

FIG. 1 is a block diagram illustrating one embodiment for a terminological system incorporating the category discovery techniques of the present invention. A terminological system 100 includes a knowledge base 155. In general, the knowledge base 155 is the repository for all knowledge about languages and about the concrete and abstract worlds described by language in human discourse. The knowledge base 155 contains two major types of data: language specific data necessary to describe a language used for human discourse, and language independent data necessary to describe the meaning of human discourse. The data is arranged in a hierarchy of categories. In addition to the categories, the knowledge base 155 also contains terms or concepts associated with the categories. A single category may have hundreds or terms associated with that category. One embodiment for the knowledge base 155 is described more fully below in the section "Knowledge Base."

The terminological system 100 discovers new categories of the knowledge base 155 by dividing one or more terminological groups of terms, associated with the category, to form one or more subcategories. To discover new categories, the knowledge base 155 is coupled to morphological processing 140. For this embodiment, morphological processing 140 comprises category splitting processing 142 and cluster processing 146. As shown in FIG. 1, category splitting processing 142 receives, as input, the target category (i.e., the category to process for potentially splitting into subcategories), and generates, as output, one or more new subcategories. In operation, one or more target categories from knowledge base 155 are input to category splitting processing 142. In turn, the category splitting processing 142 analyzes the terms of a category, within the context of a document set, to generate, as appropriate, one or more subcategories. As described fully below, the cluster processing 146 is used to identify "terminological groups" of terms, from which the subcategories are generated.

As shown in FIG. 1, morphological processing 140 utilizes documents, labeled repository of documents 125. For this embodiment, the documents 125 undergo pre-processing by a content processing system 130. Specifically, the documents are input to the content processing system 130 for analysis to generate a thematic profile of the document. For this embodiment, the thematic profile is defined as theme vector output 160. In general, the theme vector output 160 consists of, for each document, a list of themes that identify the overall thematic content of that document. In addition, the theme vector output 160 includes a theme weight, corresponding to each theme, that provides a relative measure of thematic importance relative to other themes in the document. A theme index 175 indexes the documents 125 by theme to identify documents, in the repository of documents 125, that include a particular theme. Theme index 175 facilitates the identification of documents for use in category splitting processing 142.

Dimensional Categories

In general, a terminological knowledge base may include semantic distance information among categories in the knowledge base. As between two related terms (i.e., parent-child or broader-narrower relationship), a semantic distance ascribes a quantitative value to measure the strength of the relationship between the two terms. However, ascribing quantitative values as semantic distances between categories of a knowledge base is difficult. To overcome this problem, the category discovery techniques define "dimensional categories" in the knowledge base. In general, the use of "dimensional categories" creates dimensions out of certain categories in the knowledge base hierarchy. Since categories of an ontology are related hierarchically, it is not valid to use all categories of an ontology as independent dimensions. However, since the categories are related ontologically (i.e., independent trees), the knowledge base 155 contains a "horizontal line" through the tree structure to define an appropriate level of dimensionality. Each identified category contributes to one of the selected dimensional categories, and these dimensional categories are used to calculate semantic distances. Specifically, theme weights are accumulated for dimensional categories, are then used in a standard vector distance calculation to generate semantic distance.

In one embodiment, one hundred and forty two dimensional categories are defined in the knowledge base 155. In general, the dimensional categories provide a guideline that leads to the creation of a "dimensionality line." This dimensionality line spans across the six major ontologies in the knowledge base 155. All categories in the knowledge base that lie below this dimensionality line have one and only one dimensional category in their ancestry. Although 142 is a relatively large vector space, the nature of the hierarchy results in many categories "collapsing" into these dimensional categories to provide more useful semantic distance metrics. The process of collapsing involves, for every category that is a descendant of a dimensional category, ascribing its weight to the dimensional category. For every category that is an ancestor of a dimensional category, its weight is ignored.

Although the present invention utilizes one hundred and forty two dimensional categories, any number of dimensional categories may be used without deviating from the spirit and scope of the invention. For example, in the knowledge base 155 embodiment, 6 dimensional categories, one for each top level term in each independent ontology, may be used. However, this selection may provide too high of a level of generality, and may degrade performance over a larger number of dimensional categories. For documents which are assumed to be close semantically, dimensional categories should be more specific in the area which they are assumed to be about and higher in other areas. As an alternative embodiment, an on-the-fly technique may be applied to select the level or amount of dimensional categories depending upon the specific problem in measuring semantic distance.

In one embodiment, to determine which categories of the knowledge base 155 are dimensional categories, the following criteria is used. No dimensional category may be the ancestor of another (i.e., one dimensional category cannot be a child, grandchild, great grandchild, etc. of another dimensional category). Each dimensional category specifies a particular field of study, industry or easily understood topic. Also, each dimensional category is chosen to be as close to the top of the tree structure as possible while still being specific enough to identify a field of study, industry or easily understood topic.

The following list sets forth dimensional categories in accordance with one embodiment for the knowledge base 155. Although the following list sets forth one embodiment for implementing dimensional categories, any set of categories may be used without deviating from the spirit or scope of the invention.

| | | |
|---|---|---|
| business services industry | commerce and trade | corporate business |
| economics | financial institutions | financial investments |
| financial lending | industrial business | labor and unions |
| public sector industry | taxes and tariffs | cartography |
| bodies of water | land forms | Africa |
| Antarctica | Arctic | Asia |
| Atlantic area | Caribbean | Central America |
| Europe | Indian Ocean area | Mediterranean |
| Middle East | North America | Pacific area |
| South America | acts, powers and procedures | county government |
| forms and philosophies of government | government bodies and institutions | government officials |
| government programs | international relations | law |
| municipal government | politics | postal conununications |
| public facilities | state government | military |
| journalism | publishing industry | speech communications |
| telecommunications industry | formal education | aerospace industry |
| chemical industry | chemistry | civil engineering |
| computer industry | electronics | energy industry |
| environment control industries | explosives and firearms | geology |
| inventions | biology | biotechnology |
| health and medicine | mathematics | mechanical engineering |
| physics | textiles | tools and hardware |
| anthropology | archeology | history |
| human sexuality | linguistics | psychology |
| sociology | aviation | freight and shipping |
| ground transportation | marine transportation | travel industry |
| folklore | mythology | paranormal phenomena |
| philosophy | religion | clothing |
| cosmetics | fashion industry | grooming |
| jewelry | emergency services | family |
| food and agriculture | housekeeping and butler | housewares |
| hobbies | cartoons, comic books, and superheroes | cinema |
| entertainments and spectacles | humor and satire | literature |
| performing arts | science fiction | television and radio |
| visual arts | crafts | games |
| gaming industry | gardening | outdoor recreation |
| pets | restaurant industry | smoking and tobacco |
| sports | toys | activity, action |
| change, states of change | time | communication, exchange of ideas |
| feeling, sensation | gender | mental faculties, intellect |
| social attitude, custom | states of mind, attitude | will, volition |
| ability, power | authority, power | possession, ownership |
| possibility, feasibility | purpose, use | support, aid |
| agreement, correspondence | cause, effect | difference |
| paradigms | relevance, pertinence | sameness, similarity |
| uniformity, homogeneity | variety | existence, presence |
| form, substance | quality, condition | quantity, amount |
| range, scope | | |

Category Splitting Processing

Figure 2:
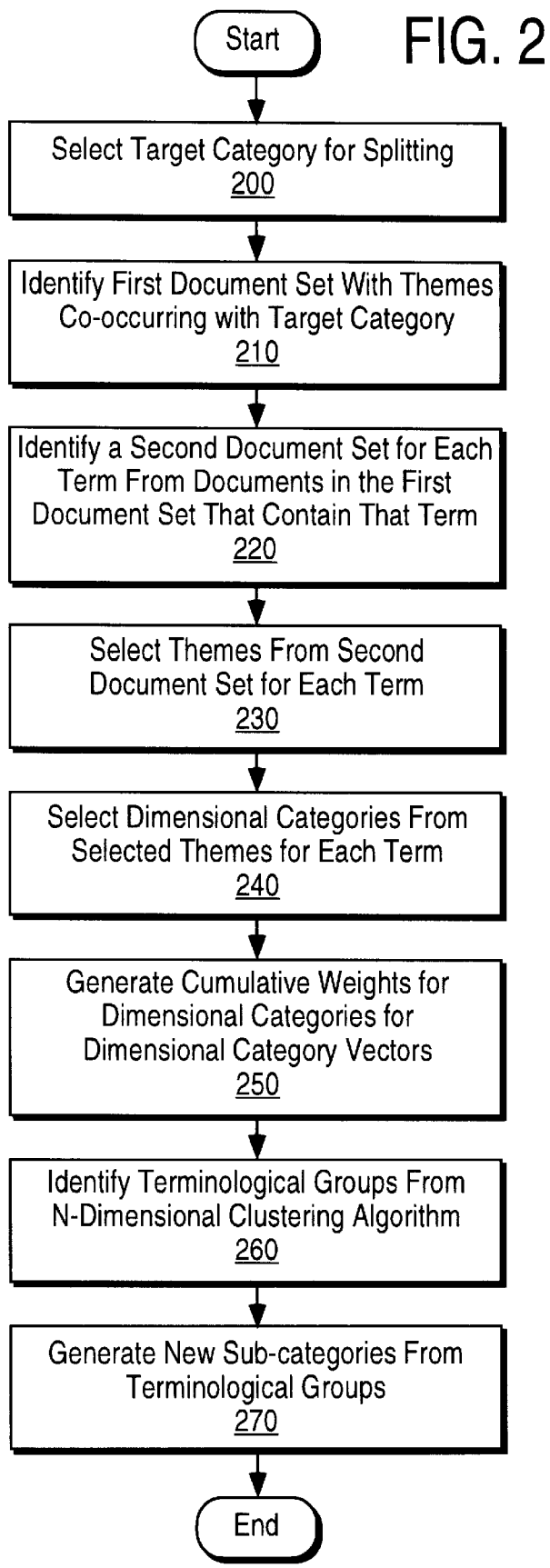
FIG. 2 is a flow diagram illustrating one embodiment for category splitting processing.

FIG. 2 is a flow diagram illustrating one embodiment for category splitting processing. First, a target category is selected for potentially splitting into one or more subcategories (block 200, FIG. 2). In one embodiment, categories with at least a pre-determined number of terms are selected as target categories. For example, if a category has over 100 terms associated with that category, then that category may be selected as a target category for splitting.

A first document set is identified from documents whose themes co-occur with the target category (block 210, FIG. 2). For example, if the target category is "computer_industry", then category splitting processing 142 selects, as the first document set, all documents having the theme for each term in the target category from documents in the first document set that contain that term (block 220, FIG. 2). As discussed above, the first document set includes those documents containing the theme of the target category. The second document set, a refinement of the first document set, includes, for each term, those documents that contain that term. Thus, a second document set is identified for each term associated with the target category. For example, if the term "Oracle_Corporation" is associated with the target category "computer_industry", then a second document set is identified that includes all documents from the first document set that include the term "Oracle_Corporation."

Themes from the second document set are selected (block 230, FIG. 2). In one embodiment, each document includes sixteen themes to identify the thematic content of the corresponding document. For this embodiment, each of the sixteen themes from the second document set are selected for further category splitting processing.

Dimensional categories corresponding to the selected themes are identified (block 240, FIG. 2). There is a one-to-one correspondence between themes and categories of the knowledge base 155. If a theme (category) is a descendant of a dimensional category, then the dimensional category is located by tracing up the hierarchical structure to identify the corresponding dimensional category. For a computer implemented technique, each theme (category) may be indexed directly to its corresponding dimensional category. If the theme (category) is an ancestor of the dimensional category, then the corresponding dimensional category is located by tracing down the hierarchical structure until the dimensional category is identified. Note that some themes (categories) may correspond to the same dimensional category.

After locating the dimensional categories, cumulative weights for the dimensional categories are generated (block 250, FIG. 2). In general, the cumulative weights for a dimensional category are calculated by summing all child category theme weights (i.e., theme weights from descendants of the dimensional category) that correspond to that dimensional category. If the category is an ancestor of the dimensional category, then its theme weight is not added to the cumulative weight for that dimensional category. Thus, only theme weights from descendants are used to calculate the cumulative weight for a dimensional category. The dimensional categories and there corresponding theme weights define the dimensional category vector.

At this stage of category splitting processing a dimensional category vector has been generated for each term. For the preferred embodiment, the dimensional category vector includes the 142 dimensional categories and their corresponding cumulative weights. Some dimensional categories may have a cumulative weight of 0.

The techniques of the present invention utilize an n-dimensional cluster algorithm for category discovery. Specifically, for this embodiment, an n-dimensional cluster algorithm is executed using the dimensional category vectors identified for each term, and their corresponding cumulative weights (block 260, FIG. 2). As discussed above, each dimensional category is considered an independent dimension. The n-dimensional cluster algorithm determines whether any group of terms, associated with the target category, are clustered around a centroid. Specifically, the mapping of the dimensional category vector to the knowledge base hierarchy reveals whether any terms are clustered about a category in the knowledge base. From this algorithm, terminological groups, if they exist, are identified (block 260, FIG. 2). If one or more terminological groups exist, then subcategories, underneath the target category, are generated, and the terms of the terminological group are then associated with the new subcategory (block 270, FIG. 2).

The following example of category discovery illustrates the category discovery embodiment of FIG. 2. However, the number of terms, associated with the target category, and the number of themes identified in the document set have been reduced for purposes of explanation. As discussed above, it will be appreciated by one skilled in the art that a target category selected for splitting may contain hundreds of terms associated with that category.

Figure 3:
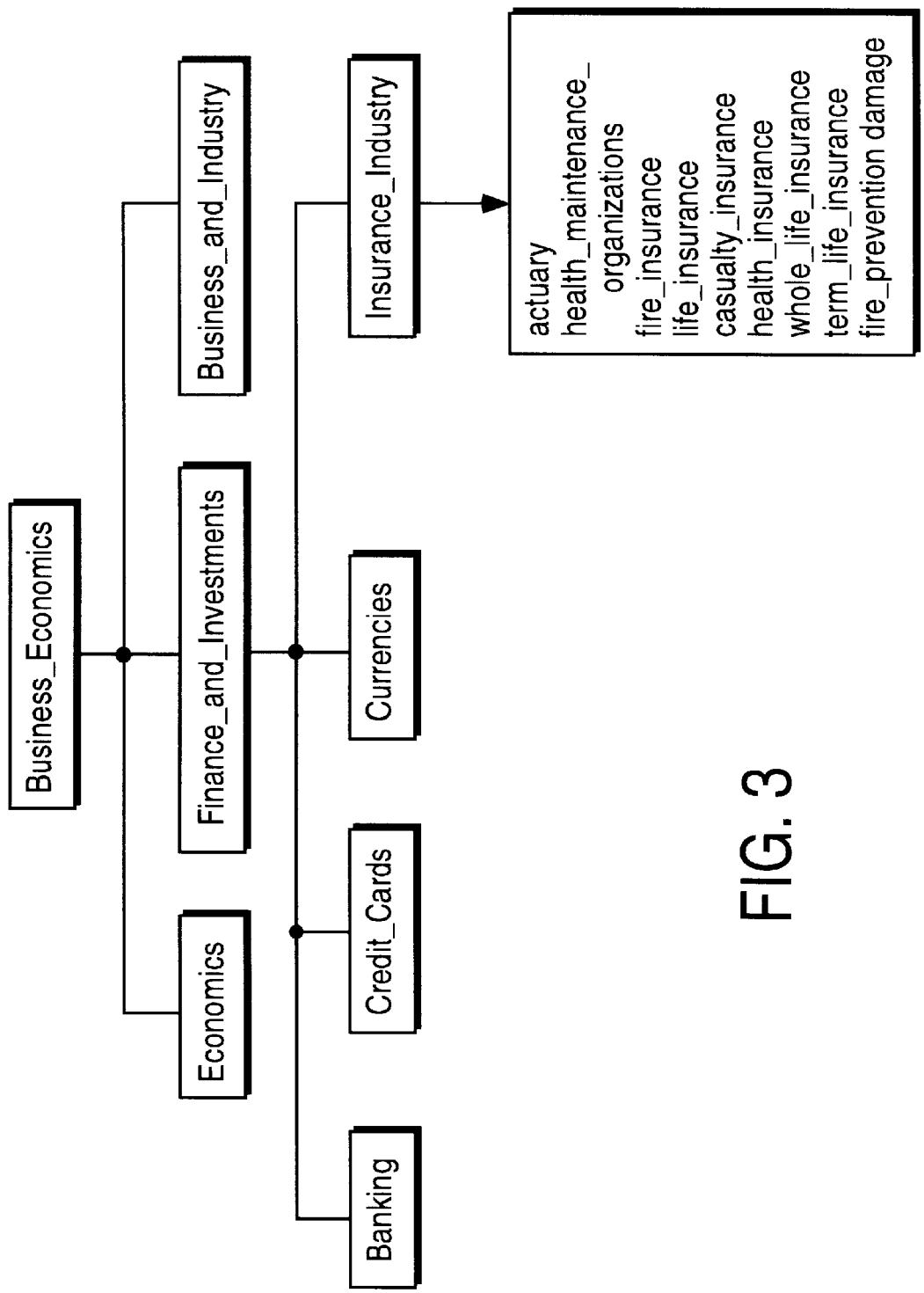
FIG. 3 illustrates a portion of an ontology in a knowledge base to illustrate an example of category splitting.

FIG. 3 illustrates a portion of an ontology in a knowledge base to illustrate an example of category splitting. Specifically, FIG. 3 shows a portion of the "business_economics" ontology. Three levels of this ontology are shown: the top level "business-economics", the first level, including the category "finance_and_investments", and the third level, including the category "insurance_industry." For this example, the category "insurance_industry" is the target category (block 200, FIG. 2). Also, for this example, the category "insurance_industry" has associated with it a plurality of terms or concepts. For this example, an abbreviated list of terms associated with the category "insurance_industry" include "actuary", "health_maintenance_organizations", "fire_insurance", "life_insurance", "casualty_insurance", "health_insurance", "whole_life_insurance", "term_life_insurance", "fire_prevention", and "damage". This example shows how these terms, associated with the target category insurance_industry, may be split.

A first set of documents with themes that co-occur with the category "insurance_industry" are identified (block 210, FIG. 2). From the first set of documents, a second set of documents are identified for each term (i.e., actuary, health_maintenance_organizations, fire_insurance, life_insurance, etc.), such that the respective term occurs in a corresponding document. For example, for the term "actuary", each document from the first set of documents that contains the term "actuary" is selected for the second set of documents. The themes for the second set of documents are selected for each term (block 230, FIG. 2). Tables 2, 3 and 4 show example documents in the second set of documents, and a few of their corresponding themes, for the "health_insurance", "casualty_insurance", and "life_insurance", terms respectively.

TABLE 1

| | |
|---|---|
| Document1 | doctors |
| | hospital |
| | pharmacy |
| Document2 | safety |
| | statistics |
| Document7 | health_maintenance_organizations |
| | health_insurance |

TABLE 2

| | |
|---|---|
| Document2 | safety |
| | statistics |
| Document3 | architecture_buildings |
| | fire_hazards |
| | fire_insurance |
| | wood |
| Document5 | automobiles |
| | collision |
| | damages |
| Document6 | fire_prevention |
| | firefighting |

TABLE 3

| | |
|---|---|
| Document2 | safety |
| | statistics |
| Document4 | whole_life_insurance |
| | term_life_insurance |
| | actuary |

For example, as shown in Table 1, the term "health_insurance" includes documents 1, 2, and 7. Document$_1$, a document primarily about health care, includes the themes "doctors", "hospital", and "pharmacy." Table 2, which shows documents and corresponding themes for the term "casualty_insurance", contains the documents document$_2$, document$_3$, document$_5$, and document$_6$. Table 3, showing documents and themes for the term "life_insurance", identifies document$_2$ and document$_4$, with their corresponding themes. The themes listed in Tables 1, 2, and 3 correspond to categories in the knowledge base 155. These themes are mapped to the knowledge base for further category splitting processing.

For each term associated with the target category "insurance_industry", a dimensional category vector is generated (blocks 240 and 250, FIG. 2). Tables 4 and 5 show example dimensional category vectors for the terms "health_insurance" and "casualty_insurance", respectively.

TABLE 4

| Dimensional Category | Cumulative Weights |
| --- | --- |
| Health and Medicine | 150 |
| Business Services Industry | 140 |
| Financial Institutions | 40 |
| Financial Investments | 60 |
| Financial Lending | 30 |
| Emergency Services | 25 |
| Government Programs | 10 |

TABLE 5

| Dimensional Category | Cumulative Weights |
| --- | --- |
| Business Services Industry | 140 |
| Financial Institutions | 40 |
| Financial Investments | 60 |
| Financial Lending | 30 |
| Ground Transportation | 20 |
| Tools and Hardware | 15 |
| Civil Engineering | 5 |
| Explosives and Firearms | 15 |

As shown in Table 4, the term "health_insurance" identifies the dimensional categories of "health and medicine", "business services industry", etc. The second column shows the cumulative weights for the corresponding dimensional category. As discussed above, in the preferred embodiment, there are 142 dimensional categories. In this example, the remaining dimensional categories for the terms shown in Tables 4 and 5 have a cumulative weight of 0.

The input to cluster processing 146 (e.g., an n-dimensional cluster algorithm) is the dimensional category vectors for each term associated with "insurance_industry." The output of cluster processing 146 is zero or more terminological groupings.

Table 6 lists three terminological groups identified by the N-dimensional cluster algorithm for the "insurance_industry" target category example.

TABLE 6

| Sub-Category Name | Terminological Group |
| --- | --- |
| life_insurance | whole_life_insurance |
| | life_insurance |
| | actuary |
| | term_life_insurance |
| health_insurance | health_maintenance_organizations |
| | health_insurance |
| casualty_insurance | fire_insurance |
| | fire_prevention |
| | damage |
| | casualty_insurance |

A first terminological group includes the terms "life_insurance", "whole_life_insurance", "actuary", and "term_life_insurance." The first terminological group is centered around the category "life_insurance." A second terminological group, centered around "health_insurance", includes the terms "health_maintenance_organizations", and "health_insurance." A third terminological group, centered around casualty_insurance, includes the terms "fire_insurance", "fire_prevention", "damage", and "casualty_insurance." Also, the output of cluster processing 146 identifies the center category of the terminological group. For this example, life_insurance, health_insurance and casualty_insurance are the center categories for the three terminological groups, respectively. These center categories are used to name the new category discovered. This is shown for the insurance_industry example on the first column of Table 6. Accordingly, the N-dimensional cluster algorithm identified three sub-categories, life_insurance, health_insurance, and casualty_insurance, to generate as new sub-categories underneath the target category insurance_industry.

N-Dimensional Cluster Processing

In one embodiment, the cluster processing 146 comprises a hierarchical agglomerative clustering technique. This clustering analysis uses the Euclidean distance to determine: the closeness or similarity between two terms; the closeness or similarity between a term and the centroid of a cluster; or the closeness or similarity between the centroids of two clusters. The Euclidean distances is defined as the square root of the sum of the squared differences between the coordinates of each variable for the two items for which the distance is being calculated. The centroid is defined as the point whose coordinates are the means of all the items in the cluster.

One issue in performing cluster processing is determining how to select the number of clusters. No standard objective procedure exists for making this selection. In one embodiment, the number of clusters is selected as follows. The total number of terms is defined as the number of terms associated with the target category (i. e., the target category for which cluster splitting processing is performed). The "single term" is defined as a term that is merged into a cluster. Given the above definitions, the cluster processing 146 stops just before the merging of two clusters if the number of single terms that have been merged into clusters is at least 7% of the total number of terms since the last time two clusters were merged. For this embodiment, the terminological groups are defined by those clusters that have been found to have at least 10% of the total number of terms contained within the cluster. One skilled in the art will recognize the steps for executing a hierarchical agglomerative clustering algorithm, with the above-identified comments, to generate the terminological groups in accordance with the present invention. Although the present invention is defined using a hierarchical agglomerative clustering algorithm for cluster processing 146, any algorithm that identifies terminological groups from dimensional category vectors may be used without deviating from the spirit or scope of the invention.

Knowledge Base

In one embodiment, the knowledge base 155 consists of concepts, general categories, and cross-references. Concepts, or detailed categories, are a subset of the canonical forms determined by the language dependent data. These concepts themselves are language independent. In different languages their text representations may be different; however, these terms represent the universal ontological location. Concepts are typically thought of as identification numbers that have potentially different representations in different languages. These representations are the particular canonical forms in those languages. General categories are themselves concepts, and have canonical form representations in each language. These categories have the additional property that other concepts and general categories can be associated with them to create a knowledge hierarchy. Cross references are links between general categories. These links augment the ancestry links that are generated by the associations that form a directed graph.

The ontology in the knowledge base 155 contains only canonical nouns and noun phrases, and it is the normalization processing in the knowledge catalog processing 740 (FIG. 5) that provides mappings from non-nouns and non-canonical nouns. The organization of the knowledge base 155 provides a world view of knowledge, and therefore the ontology actually contains only ideas of canonical nouns and noun phrases. The text representation of those ideas is different in each language, but the ontological location of the ideas in the knowledge base 155 remains the same for all languages.

The organizational part of the knowledge base 155 is the structured category hierarchy comprised at the top level of general categories. These categories represent knowledge about how the world is organized. The hierarchy of general categories is a standard tree structure. In one embodiment, a depth limit of sixteen levels is maintained. The tree organization provides a comprehensive structure that permits augmentation of more detailed information. The tree structure results in a broad but shallow structure. The average depth from tree top to a leaf node is five, and the average number of children for non-leaf nodes is 4.5.

There are two types of general categories: concrete and abstract. This distinction is an organizational one only and it has no functional ramifications. A concrete category is one that represents a real-world industry, field of study, place, technology or physical entity. The following are examples of concrete categories: "chemistry", "computer industry", "social identities", "Alabama", and "Cinema." An abstract category is one that represents a relationship, quality, fielding or measure that does not have an obvious physical real-world manifestation. The following examples are abstract categories: "downward motion", "stability", "stupidity, foolishness, fools", "mediation, pacification", "texture", and "shortness."

Many language dependent canonical form s mapped to the e language independent concepts stored as the knowledge base 155. The concept is any idea found in the real world that can be classified or categorized as being closely associated with one and only one knowledge base 155 general category. Similarly, any canonical form in a particular language can map to one and only one concept. For example, there is a universal concept for the birds called "cranes" in English, and a universal concept for the machines called "cranes" in English. However, the canonical form "cranes" does not map to either concept in English due to its ambiguity. In another language, which may have two different canonical forms for these concepts, mapping may not be a problem. Similarly, if "cranes" is an unambiguous canonical form in another language, then no ambiguity is presented in mapping.

Cross references are mappings between general categories that are not directly ancestrally related, but that are close to each other ontologically. Direct ancestral relationship means parent-child, grandparent-grandchild, great grandparent-great grandchild, etc. Cross references reflect a real-world relationship or common association between the two general categories involved. These relationships can usually be expressed by universal or majority quantification over one category. Examples of valid cross references and the relationships are shown in Table 7.

TABLE 7 oceans --> fish (all oceans have fish)
belief systems --> moral states (all belief systems address moral states)
electronics --> physics (all electronics deals with physics)
death and burial --> medical problems (most cases of death and burial are caused by medical problems)

Cross references are not automatically bidirectional. For example, in the first entry of Table 7, although oceans are associated with fish, because all oceans have fish, the converse may not be true since not all fish live in oceans. The names for the general categories are chosen such that the cross references that involve those general categories are valid with the name or label choices. For example, if there is a word for fresh water fish in one language that is different than the word for saltwater fish, the oceans to fish cross reference is not valid if the wrong translation of fish is used. Although the knowledge base 155 is described as cross linking general categories, concepts may also be linked without deviating from the spirit and scope of the invention.

Figure 4:
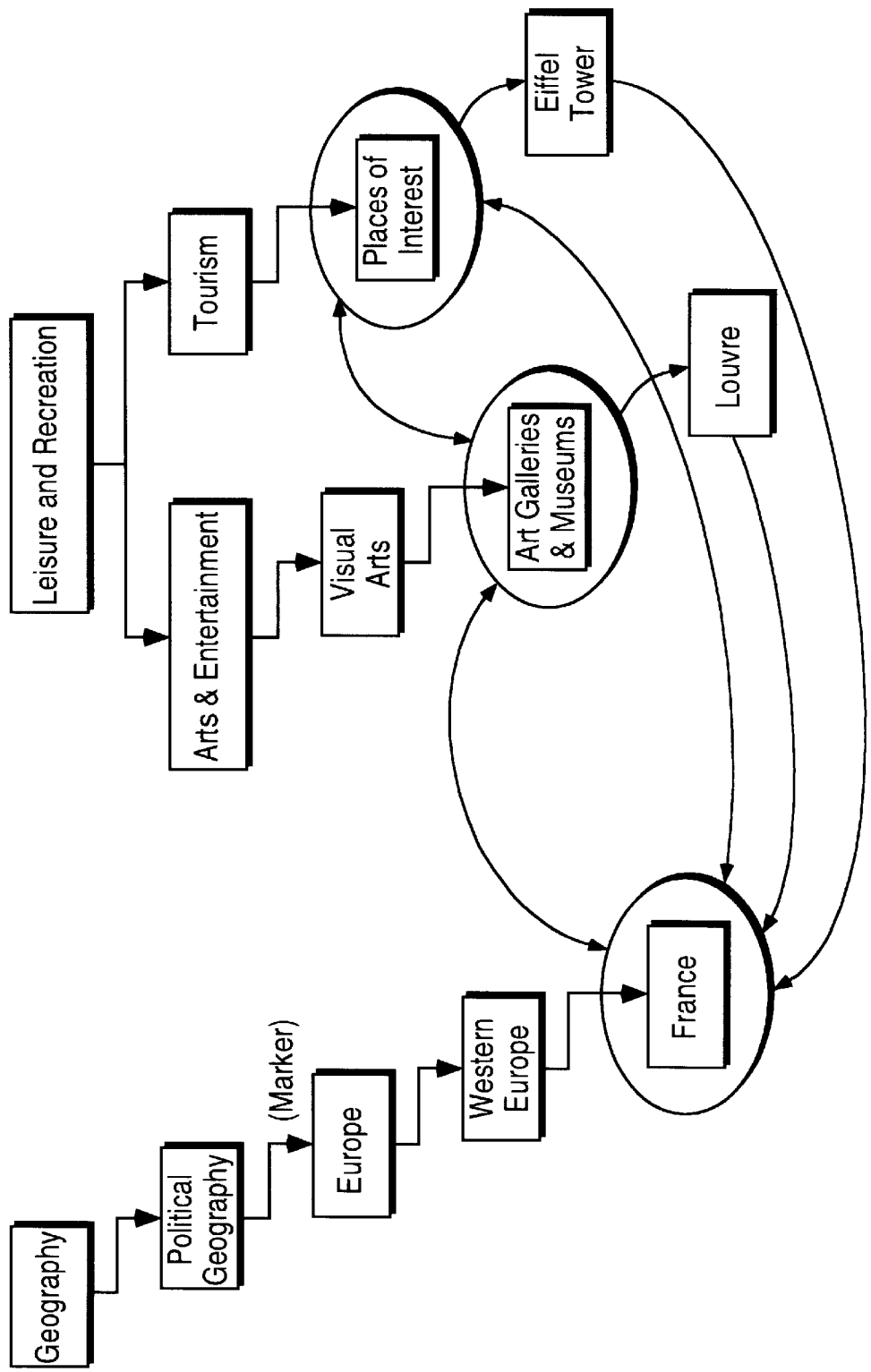
FIG. 4 illustrates an example portion of a knowledge base including cross references and links among categories and terms.

FIG. 4 illustrates an example portion of a knowledge base including cross references and links among categories and terms. The classification hierarchy and notations shown in FIG. 4 illustrate an example that classifies a document on travel or tourism, and more specifically on traveling to France and visiting museums and places of interest. As shown in FIG. 4, the classification categories (e.g., knowledge catalog 560) contains two independent static ontologies, one ontology for "geography", and a second ontology for "leisure and recreation." The "geography" ontology includes categories for "political geography", "Europe", "Western Europe", and "France." The categories "arts and entertainment" and "tourism" are arranged under the high level category "leisure and recreation." The "visual arts" and the "art galleries and museums" are subcategories under the "arts and entertainment" category, and the category "places of interest" is a subcategory under the category "tourism."

The knowledge base 155 is augmented to include liking and cross referencing among categories for which a linguistic, semantic, or usage association has been identified. For the example illustrated in FIG. 4, the categories "France", "art galleries and museums", and "places of interest" are cross referenced and/or linked as indicated by the circles, which encompass the category names, as well as the lines and arrows. This linking and/or cross referencing indicates that the categories "art galleries and museums" and "places of interest" may appear in the context of "France."

For this example, the knowledge base 155 indicates that the Louvre, a proper noun, is classified under the category "art galleries and museums", and further associates the term "Louvre" to the category "France." Similarly, the knowledge base 155 indicates that the term "Eiffel Tower" is classified under the category "places of interest", and is also associated with the category "France."

The knowledge base 155 may be characterized, in part, as a directed graph. The directed graph provides information about the linguistic, semantic, or usage relationships among categories, concepts and terminology. The "links" or "cross references" on the directed graph, which indicate the associations, is graphically depicted in FIG. 4 using lines and arrows. For the example shown in FIG. 4, the directed graph indicates that there is a linguistic, semantic, or usage association among the concepts "France", "art galleries and museums", and "places of interest."

Content Processing System

Figure 5:
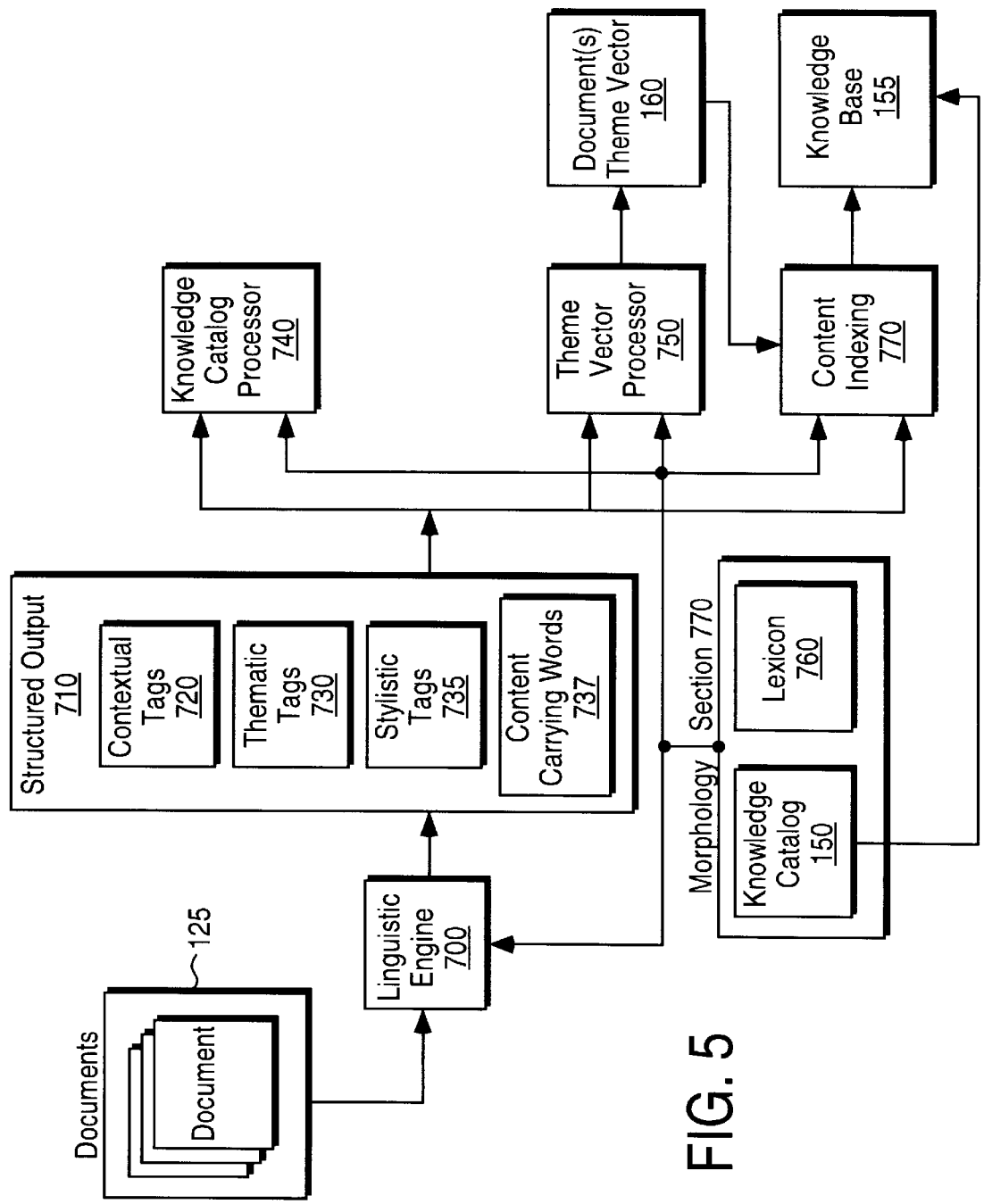
FIG. 5 is a block diagram illustrating one embodiment for a content processing system.

In one embodiment, the terminological system 100 for category discovery operates in conjunction with the content processing system 110. FIG. 5 is a block diagram illustrating one embodiment for a content processing system. In general, the content processing system 110 analyzes the thematic, contextual, and stylistic aspects of the documents 125, and generates a document theme vector 160. The document theme vector 160 identifies themes for each individual document, as well as a theme weight corresponding to each theme. In addition to identifying document themes, the content processing system 110 attempts to classify each theme in the knowledge base 155. The classifications for document themes are identified in the document theme vector 160. Table 8 is an example document theme vector 160.

TABLE 8

Document Theme Vector

| Document Themes | Theme Weight | Classification Category |
|---|---|---|
| $Theme_1$ | 190 | ($category_a$) |
| $Theme_2$ | 110 | None |
| $Theme_3$ | 70 | ($Category_c$) |
| $Theme_4$ | 27 | ($Category_d$) |
| . | . | . |
| . | . | . |
| . | . | . |
| $Theme_n$ | 8 | ($Category_z$) |

As shown in Table 8, a document theme vector 160 for a document includes a list of document themes, indicated in Table 1 by $Theme_1$–$Theme_n$. Each theme has a corresponding theme weight. The theme weight is calculated in the theme vector processor 750 (FIG. 5). The theme strength is a relative measure of the importance of the theme to the overall content of the document. For this embodiment, the larger the theme weight, the more important the theme is to the overall content of the document. The document theme vector 160 lists the document themes from the most important to the least important themes (e.g., $theme_1$–$theme_n$).

The document theme vector 160 for each document further includes, for some themes, a category for which the theme is classified. The classification category is listed in the third column of the document theme vector shown in Table 8. For example, $theme_1$ is classified in $category_a$, and $theme_3$ is classified in $category_c$.

For this embodiment, the content processing system 110 includes a linguistic engine 700, a normalization processing 120, a theme vector processor 750, and a morphology section 770. The linguistic engine 700 receives, as input, the document set 130, and generates, as output, the structured output 710. The linguistic engine 700, which includes a grammar parser and a theme parser, processes the document set 130 by analyzing the grammatical or contextual aspects of each document, as well as analyzing the stylistic and thematic attributes of each document. Specifically, the linguistic engine 700 generates, as part of the structured output 710, contextual tags 720, thematic tags 730, and stylistic tags 735 that characterize each document. Furthermore, the linguistic engine extracts topics and content carrying words 737, through use of the thematic tags 730, for each sentence in the documents. For a detailed description of the contextual and thematic tags, see U.S. Pat. No. 5,694,523, inventor Kelly Wical, entitled "Content Processing for Discourse", filed May 31, 1995, that includes an Appendix D, entitled "Analysis Documentation", which is expressly incorporated herein by reference.

In one embodiment, the linguistic engine 700 generates the contextual tags 720 via a chaos loop processor. All words in a text have varying degrees of importance in the text, some carrying grammatical information, and others carrying the meaning and content of the text. In general, the chaos loop processor identifies, for words and phrases in the documents, grammatical aspects of the documents including identifying the various parts of speech. In order to accomplish this, the chaos loop processor ascertains how the words, clauses and phrases in a sentence relate to each other. By identifying the various parts of speech for words, clauses, and phrases for each sentence in the documents, the context of the documents is defined. The chaos loop processor stores information in the form of the contextual tags 720. U.S. Pat. No. 5,694,523, inventor Kelly Wical, entitled "Content Processing System for Discourse", filed May 31, 1995, includes an Appendix C, entitled "Chaos Processor for Text", that contains an explanation for generating contextual or grammatical tags.

A theme parser within the linguistic engine 700 generates the thematic tags 730. Each word carries thematic information that conveys the importance of the meaning and content of the documents. In general, the thematic tags 730 identify thematic content of the document set 130. Each word is discriminated in the text, identifying importance or meaning, the impact on different parts of the text, and the overall contribution to the content of the text. The thematic context of the text is determined in accordance with predetermined theme assessment criteria that is a function of the strategic importance of the discriminated words. The predetermined thematic assessment criteria defines which of the discriminated words are to be selected for each thematic analysis unit. The text is then output in a predetermined thematic format. For a further explanation of a theme parser, see Appendix E, entitled "Theme Parser for Text", of U.S. Pat. No. 5,694,523, inventor Kelly Wical, entitled "Content Processing System for Discourse", filed May 31, 1995.

As shown in FIG. 5, the morphology section 770 contains the knowledge catalog 560 and a lexicon 760. In one embodiment, the knowledge catalog 560 identifies categories for the document themes. For this embodiment, the knowledge catalog 560 contains categories, arranged in a hierarchy, that reflect a world view of knowledge. Appendix A of U.S. Pat. No. 5,694,523, inventor Kelly Wical, entitled "Content Processing System for Discourse", filed May 31, 1995, is an example of a knowledge catalog for use in classifying documents.

In general, the lexicon 760 stores definitional characteristics for a plurality of words and terms. For example, the lexicon 760 defines whether a particular word is a noun, a verb, an adjective, etc. The linguistic engine 700 uses the definitional characteristics stored in the lexicon 760 to generate the contextual tags 720, thematic tags 730, and the stylistic tags 735. An example lexicon, for use with a content processing system, is described in Appendix B, entitled "Lexicon Documentation", of U.S. Pat. No. 5,694,523, inventor Kelly Wical, entitled "Content Processing System for Discourse", filed May 31, 1995.

The topics and content carrying words 737 are input to the normalization processing 120. In part, the normalization processing 120 processes the content carrying words for direct use with the knowledge catalog 560 and knowledge base 155. Specifically, the normalization processing 120 generates, as appropriate, canonical, nominal or noun form of each content carrying word, as well as the count sense and mass sense of the word. Furthermore, the normalization processing 120 determines, from the knowledge catalog 560, which content carrying words are non ambiguous.

As shown in FIG. 5, the theme vector processor 750 receives the thematic tags 730 and contextual tags 720 from the structured output 710. In addition, the non ambiguous content carrying words from the normalization processing 120 are input to the theme vector processor 750. The content carrying words may include single words or phrases. The content carrying words output from the normalization processing 120 have been converted to the noun or nominal form. In general, the theme vector processor 750 presents a thematic profile of the content of each document (e.g., generates the document theme vector 160 including classifying the documents in the knowledge catalog 560). To accomplish this, the theme vector processor 750 determines the relative importance of the non ambiguous content carrying words in the document set.

In one embodiment, the theme vector processor 750 generates a list of theme terms, including words and phrases, and assigns a relative theme strength to each theme term. The theme vector processor 750, through use of the knowledge catalog 560, generates a theme concept for each theme term by mapping the theme terms to categories in the knowledge catalog 560. Thus, the theme concepts indicate a general topic or category in the knowledge catalog 560 to identify the content of each document. In addition, the theme vector processor 750 generates, for each theme term, an importance number, a theme strength, and an overall capacity weight of collective content importance.

In one embodiment, the theme vector processor 750 executes a plurality of heuristic routines to generate the theme strengths for each theme. U.S. Pat. No. 5,694,523, inventor Kelly Wical, entitled "Content Processing System for Discourse", contains source code to generate the theme strengths in accordance with one embodiment for theme vector processing. Also, a further explanation of generating a thematic profile is contained in U.S. Pat. No. 5,694,523.

Computer System

Figure 6:
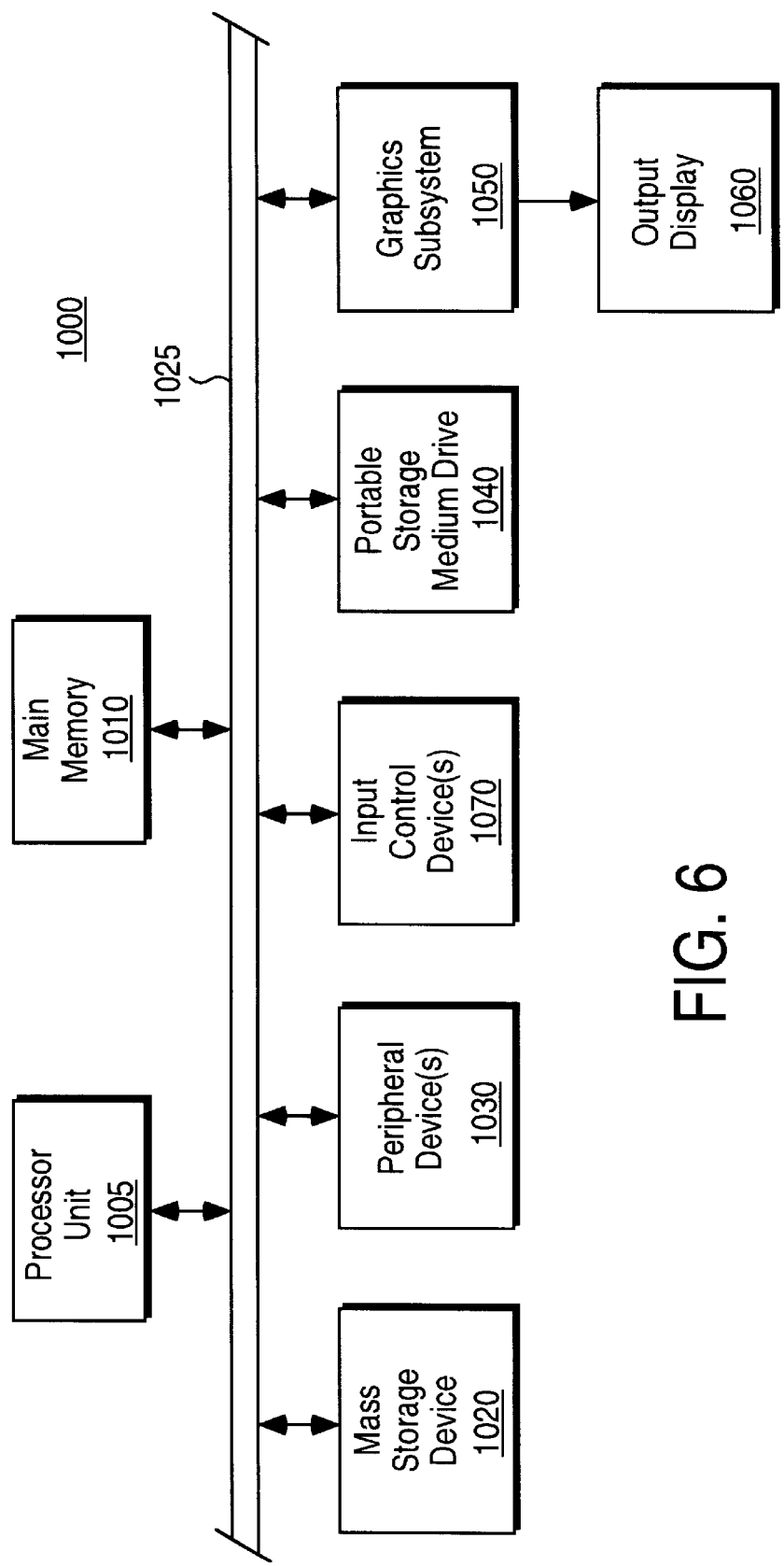
FIG. 6 illustrates a high level block diagram of a general purpose computer system in which the terminological system of the present invention may be implemented.

FIG. 6 illustrates a high level block diagram of a general purpose computer system in which the terminological system of the present invention may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. If the terminological system of the present invention is wholly or partially implemented in software, the main memory 1010 stores the executable code when in operation. The main memory 1010 may include banks of dynamic random access memory (DRAM) as well as high speed cache memory.

The computer system 1000 further includes a mass storage device 1020, peripheral device(s) 1030, portable storage medium drive(s) 1040, input control device(s) 1070, a graphics subsystem 1050, and an output display 1060. For purposes of simplicity, all components in the computer system 1000 are shown in FIG. 6 as being connected via the bus 1025. However, the computer system 1000 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may be implemented with a magnetic disk drive or an optical disk drive, is a non-volatile storage device for storing data and instructions for use by the processor unit 1005. In the software embodiment, the mass storage device 1020 stores the terminological system software for loading to the main memory 1010.

The portable storage medium drive 1040 operates in conjunction with a portable non-volatile storage medium, such as a floppy disk or a compact disc read only memory (CD-ROM), to input and output data and code to and from the computer system 1000. In one embodiment, the terminological system software is stored on such a portable medium, and is input to the computer system 1000 via the portable storage medium drive 1040. The peripheral device(s) 1030 may include any type of computer support device, such as an input/output (I/O) interface, to add additional functionality to the computer system 1000. For example, the peripheral device(s) 1030 may include a network interface card for interfacing the computer system 1000 to a network. For the software implementation, documents may be input to the computer system 1000 via a portable storage medium or a network for processing by the terminological software system.

The input control device(s) 1070 provide a portion of the user interface for a user of the computer system 1000. The input control device(s) 1070 may include an alphanumeric keypad for inputting alphanumeric and other key information, a cursor control device, such as a mouse, a trackball, stylus, or cursor direction keys. In order to display textual and graphical information, the computer system 1000 contains the graphics subsystem 1050 and the output display 1060. The output display 1060 may include a cathode ray tube (CRT) display, liquid crystal display (LCD) or flat panel display. The graphics subsystem 1050 receives textual and graphical information, and processes the information for output to the output display 1060. The components contained in the computer system 1000 are those typically found in general purpose computer systems, and in fact, these components are intended to represent a broad category of such computer components that are well known in the art.

The terminological system techniques may be implemented in either hardware or software. For the software implementation, the terminological system is software that includes a plurality of computer executable instructions for implementation on a general purpose computer system. Prior to loading into a general purpose computer system, the terminological system software may reside as encoded information on a computer readable medium, such as a magnetic floppy disk, magnetic tape, and compact disc read only memory (CD-ROM). In one hardware implementation, the terminological system may comprise a dedicated processor including processor instructions for performing the functions described herein. Circuits may also be developed to perform the functions described herein.

Although the present invention has been described in terms of specific exemplary embodiments, it will be appreciated that various modifications and alterations might be made by those skilled in the art without departing from the spirit and scope of the invention.

What is claimed is:

1. A method for automated generation of sub-categories from categories of a terminological knowledge base, said method comprising the steps of:

storing a corpus of documents, wherein a document comprises a plurality of themes, and a theme identifies thematic content contained within said document;

storing a knowledge base comprising a plurality of hierarchically arranged categories, wherein a subset of said categories of said knowledge base comprise dimensional categories;

selecting a target category in said knowledge base to generate at least one new sub-category, said target category comprising a plurality of terms classified within said target category, such that one or more groups of terms associated with said target category are divided for association with said new sub-category;

selecting, for each term classified within said target category, a plurality of themes from said corpus of documents;

generating a plurality of dimensional category vectors, one for each term, by associating said themes selected for a term to a dimensional category;

determining if one or more terminological groups of terms exist in said knowledge base by clustering said dimensional category vectors for each term; and selecting, as said new sub-category for said target category, one or more terminological groups discovered.

2. The method as set forth in claim 1, further comprising the steps of:

storing a theme weights for said themes;

generating cumulative weights for said dimensional category vectors from corresponding themes; and utilizing said cumulative weights in said dimensional category vectors to ascertain terminological groups.

3. The method as set forth in claim 2, wherein the step of generating cumulative weights for said dimensional category vectors comprising the steps of:

storing ancestor and descendant relationships for hierarchically arranged categories in said knowledge base; and summing theme weights from said themes associated to a dimensional category if said category and said dimensional category comprises a descendant relationship, respectively, and not an ancestor relationship.

4. The method as set forth in claim 1, wherein the step of selecting, for each term associated with said target category, a plurality of themes from said corpus of documents comprises the steps of:

selecting a first document set, comprising a plurality of documents, that include said target category as a theme;

selecting a second set of documents, for each term, that includes documents from said first set that contain said term; and selecting themes, for each term, that correspond to said second set of documents.

5. The method as set forth in claim 1, wherein the step of determining if one or more terminological groups of terms exist in said knowledge base by clustering said dimensional category vectors for each term comprises the step of executing a multi-dimensional clustering algorithm, wherein each dimensional category comprises a single dimension in said multi-dimensional clustering algorithm.

6. A computer readable medium for automated generation of sub-categories from categories of a terminological knowledge base comprising a set of instructions, which when executed by a computer, causes the computer to perform the steps of:

storing a corpus of documents, wherein a document comprises a plurality of themes, and a theme identifies thematic content contained within said document;

storing a knowledge base comprising a plurality of hierarchically arranged categories, wherein a subset of said categories of said knowledge base comprise dimensional categories;

selecting a target category in said knowledge base to generate at least one new sub-category, said target category comprising a plurality of terms classified within said target category, such that one or more groups of terms associated with said target category are divided for association with said new sub-category;

selecting, for each term classified within said target category, a plurality of themes from said corpus of documents;

generating a plurality of dimensional category vectors, one for each term, by associating said themes selected for a term to a dimensional category;

determining if one or more terminological groups of terms exist in said knowledge base by clustering said dimensional category vectors for each term; and selecting, as said new sub-category for said target category, one or more terminological groups discovered.

7. The computer readable medium as set forth in claim 6, further comprising the steps of:

storing a theme weights for said themes;

generating cumulative weights for said dimensional category vectors from corresponding themes; and utilizing said cumulative weights in said dimensional category vectors to ascertain terminological groups.

8. The computer readable medium as set forth in claim 7, wherein the step of generating cumulative weights for said dimensional category vectors comprising the steps of:

storing ancestor and descendant relationships for hierarchically arranged categories in said knowledge base; and summing theme weights from said themes associated to a dimensional category if said category and said dimensional category comprises a descendant relationship, respectively, and not an ancestor relationship.

9. The computer readable medium as set forth in claim 6, wherein the step of selecting, for each term associated with said target category, a plurality of themes from said corpus of documents comprises the steps of:

selecting a first document set, comprising a plurality of documents, that include said target category as a theme;

selecting a second set of documents, for each term, that includes documents from said first set that contain said term; and selecting themes, for each term, that correspond to said second set of documents.

10. The computer readable medium as set forth in claim 6, wherein the step of determining if one or more terminological groups of terms exist in said knowledge base by clustering said dimensional category vectors for each term comprises the step of executing a multi-dimensional clustering algorithm, wherein each dimensional category comprises a single dimension in said multi-dimensional clustering algorithm.

11. An apparatus comprising:

a corpus of documents, wherein a document comprises a plurality of themes, and a theme identifies thematic content contained within said document;

a knowledge base comprising a plurality of hierarchically arranged categories, wherein a subset of said categories of said knowledge base comprise dimensional categories; and processor unit coupled to said corpus of documents and said knowledge base for selecting a target category in said knowledge base to generate at least one new sub-category, said target category comprising a plurality of terms classified within said target category such that one or more groups of terms associated with said target category are divided for association with said new sub-category, for selecting, for each term classified within said target category, a plurality of themes from said corpus of documents, for generating a plurality of dimensional category vectors, one for each term, by associating said themes selected for a term to a dimensional category, for determining if one or more terminological groups of terms exist in said knowledge base by clustering said dimensional category vectors for each term, and for selecting, as said new sub-category for said target category, one or more terminological groups discovered.

* * * * *